(12) United States Patent
Milne et al.

(10) Patent No.: US 8,542,189 B2
(45) Date of Patent: *Sep. 24, 2013

(54) ACCELEROMETER-BASED TAPPING USER INTERFACE

(75) Inventors: James R. Milne, Ramona, CA (US);
Kirstin Connors, San Diego, CA (US);
Trisha Ann Sachie Yasuhara, San Diego, CA (US)

(73) Assignee: Sony Corporation, Tokyo (JP)

( * ) Notice: Subject to any disclaimer, the term of this patent is extended or adjusted under 35 U.S.C. 154(b) by 896 days.

This patent is subject to a terminal disclaimer.

(21) Appl. No.: 12/705,106

(22) Filed: Feb. 12, 2010

(65) Prior Publication Data

US 2011/0109540 A1    May 12, 2011

Related U.S. Application Data

(60) Provisional application No. 61/258,731, filed on Nov. 6, 2009.

(51) Int. Cl.
*G06F 3/033* (2013.01)
*G09G 5/08* (2006.01)

(52) U.S. Cl.
USPC .......................................... 345/158; 345/156

(58) Field of Classification Search
USPC ........................ 345/158, 156, 169, 173–175
See application file for complete search history.

(56) References Cited

U.S. PATENT DOCUMENTS

| 6,861,946 | B2 | 3/2005 | Verplaetse et al. |
| 7,420,510 | B2 | 9/2008 | Kolavennu et al. |
| 8,289,162 | B2 * | 10/2012 | Mooring et al. ............ 340/546 |
| 2003/0001865 | A1 | 1/2003 | Hirose et al. |
| 2004/0145613 | A1 | 7/2004 | Stavely et al. |
| 2005/0059406 | A1 | 3/2005 | Thomson et al. |
| 2007/0152984 | A1 | 7/2007 | Ording et al. |
| 2008/0048980 | A1 | 2/2008 | Love et al. |
| 2008/0143675 | A1 | 6/2008 | Hsieh et al. |
| 2008/0182584 | A1 | 7/2008 | Le |
| 2008/0192021 | A1 | 8/2008 | Lim et al. |
| 2008/0211775 | A1 | 9/2008 | Hotelling et al. |
| 2008/0309624 | A1 | 12/2008 | Hotelling |
| 2009/0007006 | A1 | 1/2009 | Liu et al. |
| 2009/0085878 | A1 | 4/2009 | Heubel et al. |
| 2009/0133499 | A1 | 5/2009 | Cato |
| 2009/0153466 | A1 | 6/2009 | Tilley |

(Continued)

FOREIGN PATENT DOCUMENTS

| EP | 1062994 | 12/2001 |
| WO | 2009102713 | 8/2009 |

OTHER PUBLICATIONS

Hiroya Fujii, Isamu Arie, Ronald Clark, Justin Randolf Jakobson, Yuji Oikawa, Joe Wada, Rui Yamagami, Takuo Ikeda, Chia-Yao Lin, Junghee Yeo, "Digital Clock with Internet Connectivity and Multiple Resting Orientations", File history of co-pendning U.S. Appl. No. 12/820,458, filed Jun. 22, 2010.

(Continued)

*Primary Examiner* — Ricardo L Osorio

(74) *Attorney, Agent, or Firm* — Sony Corporation

(57) ABSTRACT

A CE device for, e.g., displaying the time can incorporate an accelerometer to provide various features and enhancements. For example, tapping of the housing as sensed by the accelerometer may be used for controlling various application modes of the device.

19 Claims, 4 Drawing Sheets

(56) References Cited

U.S. PATENT DOCUMENTS

| | | | |
|---|---|---|---|
| 2009/0174680 A1 | 7/2009 | Amzures et al. | |
| 2009/0262074 A1 | 10/2009 | Nasiri et al. | |
| 2010/0014691 A1 | 1/2010 | Moseley et al. | |
| 2010/0070281 A1* | 3/2010 | Conkie et al. | 704/260 |
| 2012/0064922 A1* | 3/2012 | Podoloff et al. | 455/456.6 |
| 2012/0299858 A1* | 11/2012 | Conkie et al. | 345/173 |

OTHER PUBLICATIONS

James R. Milne, Kirstin Connors, Trisha Ann Sachie Yasuhara, "Accelerometer-Based CE Device Wireless Access Point Mapping", File History of co-pending U.S. Appl. No. 12/705,173, filed Feb. 12, 2010.

Paul Jin Hwang, Fredrik Carpio, Nikolaos Georgis, Benjamin Lo, "GPS-Based CE Device Wireless Access Point Mapping", File History of co-pending U.S. Appl. No. 12/715,525, filed Mar. 2, 2010.

Silver PAC, "Silver PAC Evolution 5500 Remote Would Have Been Great 3 Years Ago", Dec. 14, 2009; http://gizmodo.com/5426322/silver-pac-evolution-5500-remotoe-would-have-been-grat-3-years-ago.

The chumby one—a new faster, cheaper chumby, Nov. 16, 2009; http://krunker.com/2009/11/16/the-chumby-one-a-new-faster-cheaper-chumby/.

Radionow, "Intergrated DAB, wi-fi, Twitter and Facebook? It makes Pure Sensia", Sep. 21, 2009; http://www.radio-now.com.uk/pure-sensia-wifi-dab-fadio.htm.

Kristofer Brazio, "Sungale IB800WT 8 Inch Wi-Fi Digital Touchscreen Photo Frame", Jun. 30, 2009; http://www.testfreaks.com/blog/reviews/sungale-id800wt-8-inch-wi-fi-digital-touchscreen-photo-frame/.

AXISS Technology Corporation, Taiwan, "WiFi Digital Photo Frame", http://tsyannaw.trustpass.alibaba.com/product/104940461-101256632/8_Inch_Digital_Photo_Frame.html.

A.R. Sandeep, Y.Shreyas, Shivam Seth, Rajat Agarwal, G. Sadashivappa; "Wireless Network Visualization and Indoor Empirical Propagation Model for a Campus Wi-Fi Network", http://www.waset.org/journals/wset/v42/v42-135.pdf, 2008.

Junfang Wang, Bin Xie, Kan Cai, Agrawal, D.P., "Efficient Mesh Router Placement in Wireless Mesh Networks", http://ieeexplore.ieee.org/xpl/freeabs_all.jsp?arnumber=4428616, 2007.

S.Kouhbor, Julien Ugon, Alex Kruger, Alex Rubinov of University of Ballarat; "Optimal Placement of Access Point in WLAN Based on a New Algorithm" http://www.computer.org/portal/web/csdl/dio/10-1109/CMB.2005.75, 2005.

Leslie A. Lenert, Douglas A. Plamer, Theodore C. Chan, Ramesh Rao; "An Intelligent 802.11 Triage for medial Response to Disasters", http://www.ncbi.nlm.nih.gov/pmc/articles/PMC1560742/.

Apple, "Apple iPod touch 8 GB (2nd Generation)" http://www.amazon.com/Apple-touch-Generation-Previous-Model/dp/B001FA1NZK.

Filip Truta, "Engineer Invents 'iPod cube' with Accelerometer Player can sense inclination, tilt and shock", http://news.softpedia.com/news/Engineer-Invents-039-iPod-cube-039-with-Accelerometer-103244.shtml, Jan. 29, 2009.

Lesile A. Lenert, Douglas A. Palmer, Theodore C. Chan. Ramesh Rao; "An Intelligent 802.11 Triage Tag for Medial Response to Disasters" http//www.ncbi.nlm.nih.gov/pmc/articles/PMC1560742/.

Unofficial iPhone Blog, "What Does Built-In Sensors and Accelerometer in iPhone Are For?" http://www.vmfactor.com/iPhone/?tag=iphone-orientation, 2008.

Jacob Schulman, "iPhone/iTouch App of the Day: Labyrinth", http://macapper.com/2007/11/01/iphoneitouch-app-of-the-day-labyrinth/, Nov. 1, 2007.

Nokia, "Nokia 6600 Slide (Black)—Unlocked Sim Free Mobile P . . . " http://www.superetrader.co.uk/nokia-660-slide-black-unlocked-sim-free-mobile-phone-p-3393.html.

Absolute Astronomy, "Accelerometer" http://www.absoluteastronomy.com/topics/Accelerometer.

Apple, "What do the proximity and orientation sensors in the iPhone do" http://www.iphonefaq.org/archives/9721, Jan. 19, 2007.

Milne at al., "Accelerometer-Based Touchscreen User Interface", co-pending U.S. Appl. No. 12/698,507, filed Feb. 2, 2010.

Joern Loviscach, "Two-finger input with a standard touch screen", http://delivery.acm.org/10.1145/1300000/1294239/p169-loviscach.pdf?key1=569877062&coll-GUIDE&dl=GUIDE&CFID=68226013&CFTOKEN=27729349, pp. 169-172.

"Apple extending multi-touch to mice?" http://hrmpf.com/wordpress/131/apple-extending-multi-touch-to-mice, Jul. 5, 2007.

James R. Milne, Kirstin Connors, Trisha Ann Sachie Yasuhara, "Accelerometer-Based Touchscreen User Interface", pending U.S. Appl. No. 12/698,507, filed Feb. 2, 2010 office action dated May 2, 2012.

James R. Milne, Kirstin Connors, Trisha Ann Sachie Yasuhara, "Accelerometer-Based Touchscreen User Interface", pending U.S. Appl. No. 12/698,507, filed Feb. 2, 2010 applicant response filed May 10, 2012 to office action dated May 2, 2012.

James R. Milne, Kirstin Connors, Trisha Ann Sachie Yasuhara, "Accelerometer-Based Touchscreen User Interface", pending U.S. Appl. No. 12/698,507, filed Feb. 2, 2010 office action dated Jun. 26, 2012.

James R. Milne, Kirstin Connors, Trisha Ann Sachie Yasuhara, "Accelerometer-Based Touchscreen User Interface", pending U.S. Appl. No. 12/698,507, filed Feb. 2, 2010 applicant response file Jul. 9, 2012 office action dated Jun. 26, 2012.

\* cited by examiner x-axis tap spikes

Tap for snooze

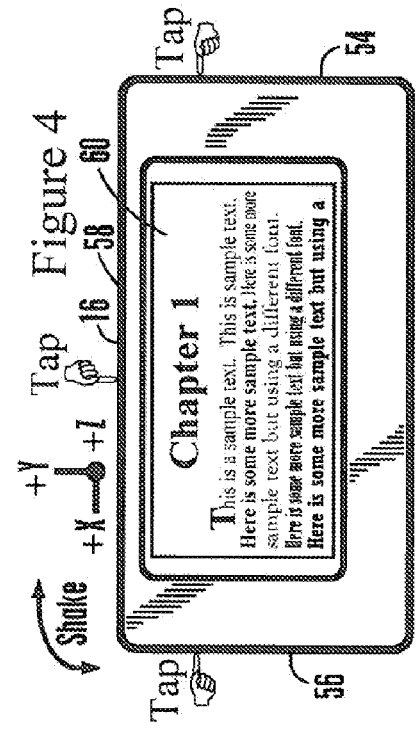
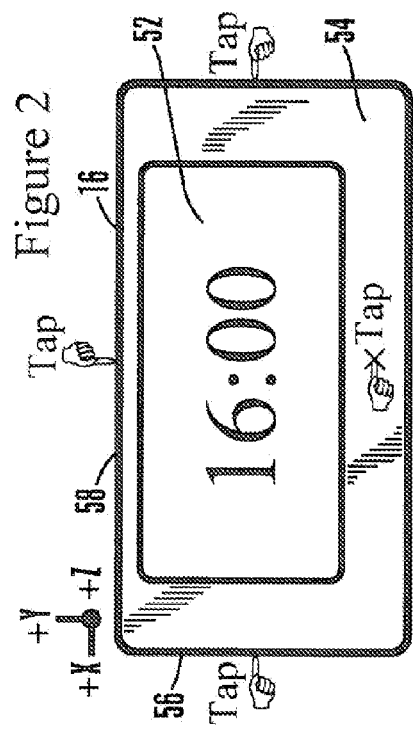

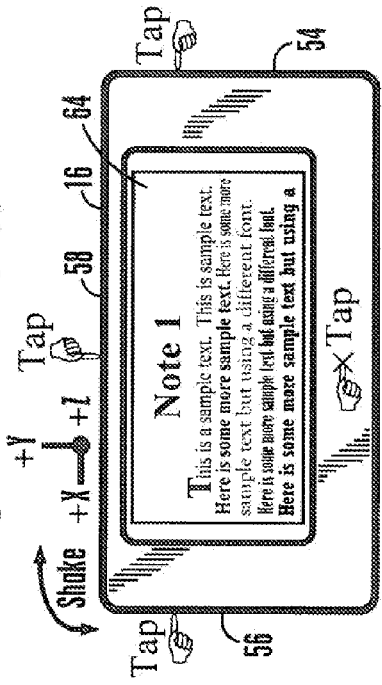

Figure 8 Note tap application

| AXIS | Single Tap | Double Tap | Shake |
|---|---|---|---|
| +X | previous note | | erase note |
| -X | next note | | erase note |
| +Y | | | erase note |
| -Y | directory listing | | erase note |
| +Z | | download to iPhone | erase note |
| -Z | | download to iPhone | erase note |

Figure 9

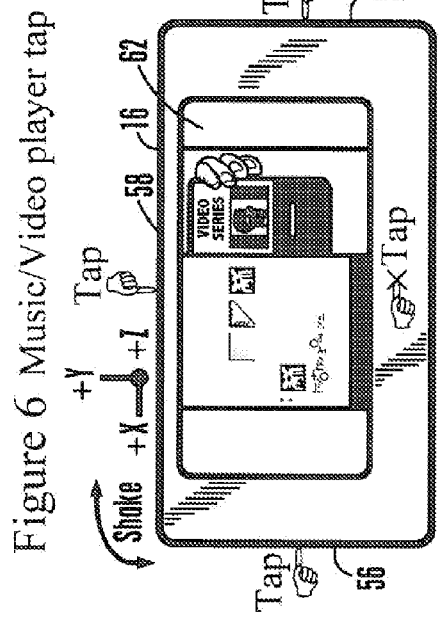

Figure 6 Music/Video player tap

| AXIS | Single Tap | Double Tap | Shake |
|---|---|---|---|
| +X | song beginning | previous song | play random song |
| -X | next song | | play random song |
| +Y | | | play random song |
| -Y | | | play random song |
| +Z | pause | play | play random song |
| -Z | | | play random song |

Figure 7

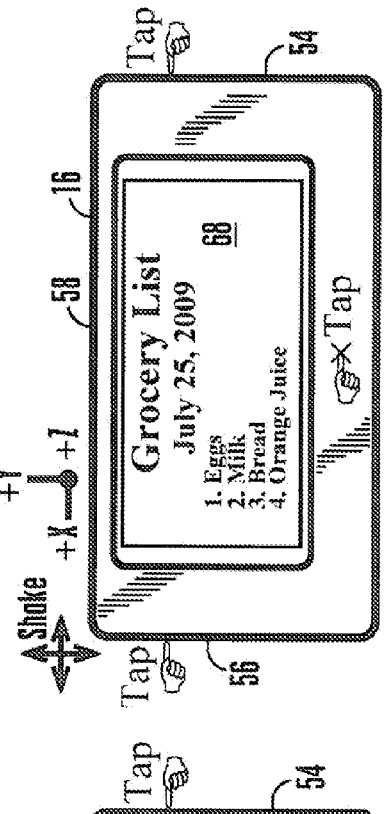
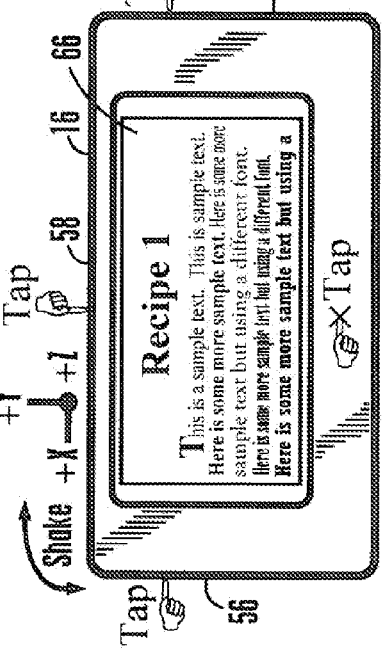

ACCELEROMETER-BASED TAPPING USER INTERFACE

This application claims priority from U.S. provisional application 61/258,731, filed Nov. 6, 2009.

FIELD OF THE INVENTION

The present application is directed to using an accelerometer in a consumer electronics (CE) device to provide enhanced functionality of the CE device.

BACKGROUND OF THE INVENTION

A wide variety of CE devices such as wireless telephones, digital clocks, etc. have been provided that leverage digital processing to provide a multiplicity of useful features to users. The present application understands that such devices may be further enhanced by incorporating accelerometer principles.

As understood herein, compact technology known as microelectromechanical systems (MEMS) has been used to establish an accelerometer which, among other things, can measure acceleration above and below the gravitational constant. Essentially, an accelerometer may be provided that measures acceleration in all three spatial dimensions (e.g., along all three linear Cartesian axes), and the acceleration of an object such as a CE device in space may be correlated to the object's orientation, motion, and to detect taps on the object.

For instance, present principles understand that once an initial orientation is established, acceleration signals may be used to determine if an object is changing its orientation. As also recognized herein, a tap on an object can be sensed using an accelerometer because another object colliding with the accelerometer-bearing object causes a deceleration, e.g., a tap came from the +Z direction relative to the accelerometer makes an impact in the −Z direction. There are several variations to the above properties including tilt, shake, and free fall, but essentially these variations fit into one or more of the three main properties.

SUMMARY OF THE INVENTION

A consumer electronics (CE) device includes a housing bearing a processor, a visual display, and an audio display. The processor controls the displays. An accelerometer is in the housing and outputs signals to the processor representing acceleration of the housing induced by a person tapping the housing. The processor determines a surface of the housing being tapped and a number of taps on the surface within a predetermined period of each other. The processor correlates the surface being tapped and number of taps on the surface to a user command to alter presentation of the application on the display.

For example, the command can be a "next" command to cause the processor to present a next item in a list. Or, the command can be a "previous" command to cause the processor to present a previous item in a list. In some examples, at least one tap on a first surface of the housing is correlated to a first command and at least one tap on a second surface of the housing is correlated to a second command different from the first command, with the surfaces being orthogonal to each other. In example embodiments the application is a clock application and the processor causes an alarm to be presented on the audio display. The processor silences the alarm in response to a signal from the accelerometer indicating a tap on the housing. Yet again, the application may be a music and/or video application, in which case the first command can be a "play next" command and the second command can be a "play previous" command. When the application is a music and/or video application, a single tap on a first surface of the housing may be correlated to a "pause" command to cause presentation of an audio and/or video file to be paused, while at least two taps can be correlated to a "play" command to cause a paused audio and/or video file to be played on the CE device. Or yet again, the application can be a reader application or a grocery list application or a recipe application or a notes application.

In another aspect a consumer electronics (CE) device includes a housing bearing a processor, an audio display, and a visual display. The processor controls the displays. An accelerometer in the housing outputs signals to the processor representing acceleration of the housing. The processor presents a time of day on the visual display. The accelerometer senses when a person taps various surfaces of the CE device to signal intended input meanings. Specifically, a double tap on a first surface of the CE device can be interpreted by the processor as a command to present on the visual display a first menu, from which the user may select, using selector elements presented on the visual display, various alarm parameters. In contrast, two taps on a second surface of the CE device can be interpreted by the processor as a command to present a second menu on the visual display.

In example embodiments, a single tap on a third surface of the CE device is interpreted by the processor to command the processor to silence an audible alarm being presented on the audio display. On the other hand, a single tap on a fourth surface of the CE device may be interpreted by the processor as a command to cause the processor to toggle between a twelve hour time presentation and a twenty four hour presentation on the visual display.

In another aspect, a method includes determining at least one tap has been made against a surface of a housing of a CE device based on signals from an accelerometer in the housing. The method also includes determining which surface of the housing has been tapped based on the signals from the accelerometer. In response to the determining acts, the method includes causing a next item of an application running on the CE device to be presented on at least one of the displays responsive to the processor determining that a first command has been input by taps. Also, the method includes causing a previous item of an application running on the CE device to be presented on at least one of the displays responsive to the processor determining that a second command has been input by taps.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a screen shot of an example CE device in a clock mode showing a data display, showing the accelerometer axes;

FIG. 3 is a table showing an example correlation of taps to clock control signals used by the processor to control the clock mode;

FIG. 4 is a screen shot of an example CE device in a reader mode showing a data display, showing the accelerometer axes;

FIG. 5 is a table showing an example correlation of taps to reader control signals used by the processor to control the reader mode;

FIG. 6 is a screen shot of an example CE device in a player mode showing a data display, showing the accelerometer axes;

FIG. 7 is a table showing an example correlation of taps to player control signals used by the processor to control the player mode;

FIG. 8 is a screen shot of an example CE device in a note mode showing a data display, showing the accelerometer axes;

FIG. 9 is a table showing an example correlation of taps to note control signals used by the processor to control the note mode;

FIG. 10 is a screen shot of an example CE device in a recipe mode showing a data display, showing the accelerometer axes;

FIG. 11 is a table showing an example correlation of taps to recipe control signals used by the processor to control the recipe mode;

FIG. 12 is a screen shot of an example CE device in a grocery list mode showing a data display, showing the accelerometer axes;

FIG. 13 is a table showing an example correlation of taps to grocery list control signals used by the processor to control the grocery list mode.

DETAILED DESCRIPTION OF THE PREFERRED EMBODIMENT

Figure 1:
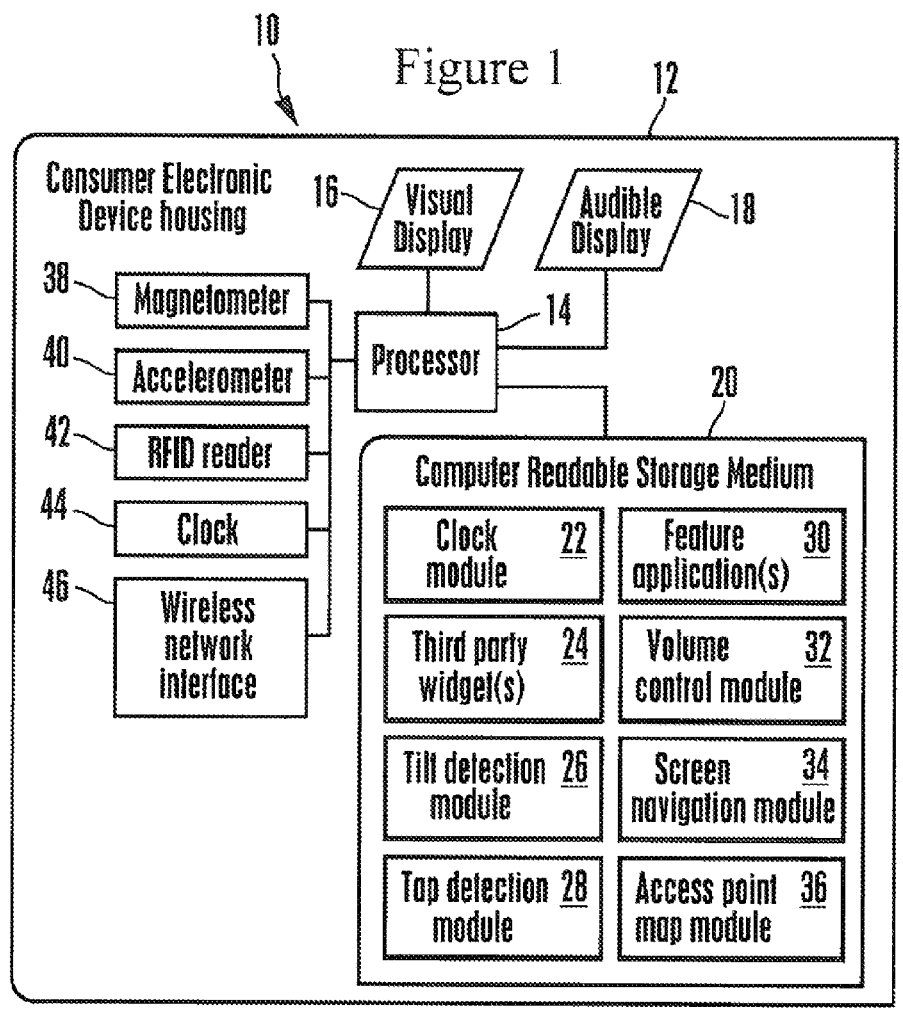
FIG. 1 is a block diagram of an example system in accordance with present principles.

Referring initially to FIG. 1, a CE device 10 is shown that includes a typically portable lightweight plastic housing 12 bearing a digital processor 14. The processor 14 can control a visual display 16 and an audible display 18 such as one or more speakers. The visual display 16 may be, e.g., a capacitive touchscreen display, although other display types may be used.

To undertake present principles, the processor 14 may access one or more computer readable storage media 20 such as but not limited to disk-based or solid state storage. In example non-limiting embodiments, the media 20 may store various software modules, including, for example, a clock module 22 for presenting a visual indication of time on the display 16, and one or more widgets 24 that may be provided by third parties and/or by the manufacturer of the CE device. By "widget" is meant a portable module of computer software that can be installed and executed within, for example, a HTML-based web page by an end user without requiring compilation. Widgets can take the form of on-screen tools (such as, e.g., clocks, event countdowns, auction-tickers, stock market tickers, flight arrival information, daily weather etc).

Additionally, the media 20 may store a tilt detection module 26 and a tap detection module 28. The tilt detection module 26 can be executed by the processor 14 to translate acceleration signals from the below-described accelerometer into an indication of tilting the CE device 10 about one or more spatial axes. Because the acceleration signals represent acceleration in each of the three dimensions of space, such translation to tilt is straightforward, essentially representing the combination of three acceleration vectors.

In contrast, the tap module 28 may be executed by the processor 14 to determine that a person has tapped the housing 12 by observing a spike (sudden increase followed by sudden decrease) in acceleration in at least one of the three dimensions.

The media 20 may also include one or more feature application(s) 30 such as an e-book application, a recipe application, a notes application in which, for instance, a user can input handwriting by moving a stylus over the display 16 which is then translated by image recognition software into alpha-numeric character code for storage, and a music/video player application, a grocery list application in which, for instance, a user can input grocery items by moving a stylus over the display 16 which is then translated by image recognition software into alpha-numeric character code for storage.

Additionally, the media 20 may bear a volume control module 32 and a screen navigation module 34. A wireless access point (AP) map module 36 may also be stored on the media 20.

The left portion of FIG. 1 shows that in addition to the processor 14, displays 16, 18, and media 20, the housing 12 may hold a magnetometer 38 which outputs a signal to the processor 14 representing magnetic north. Also, an accelerometer assembly 40 communicates acceleration signals to the processor 14 for purposes to be shortly disclosed. In one example, the accelerometer 40 is a MEMS-based accelerometer which outputs signals representing acceleration in each of the three spatial dimensions.

In some example, a radiofrequency identification (RFID) reader 42 may input signals to the processor 14 indicating IDs read from RFID tags external to the housing 12. A computer clock 44 may also be provided to output a time of day signal to the processor 14 for display of the time on the visual display 16 and for, e.g., the sounding of a time-based alarm on the audible display 18. If desired, a wireless network interface 46 may be in the housing 12 and may communicate with the processor 14 to permit the processor 14 to communicate with a wide area computer network such as the Internet. The interface 46 may be, without limitation, a WiFi interface.

Figure 1A:
FIG. 1A is a graph of x-dimension acceleration spikes induced by taps on the housing, as a function of time.

FIG. 1A shows the signals generated by the accelerometer 40 when a person taps on the housing 12. For purposes of exposition, assume that in the figures the x-dimension extends horizontally (left to right looking down on the figures), the y-dimension extends vertically (from top to bottom on the page), and the z-axis extends out of the paper. Assume further that positive x acceleration is right to left, positive y acceleration is bottom to top, and positive z acceleration is into the page, it being understood that these conventions are for illustration only and non-limiting.

FIG. 1A thus assumes that a first, positive signal 48 is generated when a user taps on the right edge of the housing 12, and a second, negative signal 50 is generated when a user taps on the left edge. Similarly, positive and negative spikes are generated in the y dimension when the user respectively taps on the bottom and top edges of the housing 12, etc. By noting which dimension and which polarity a spike has, the processor 14 executing the tap module 28 can readily determine which part of the housing has been tapped and, thus, can readily correlate positional taps to user input signals having intended predetermined meanings.

FIGS. 2 and 3 illustrate that a clock mode can be entered by executing the clock module 22 shown in FIG. 1 in which a time of day presentation 52 is shown on the display 16. As indicated by the "tap" icons in FIG. 2, a person can tap various edges/surfaces of the CE device 10 to signal intended input meanings in the clock mode.

FIG. 3 is a table showing example non-limiting correlations between tap location and/or number of taps on the one hand and intended command meanings on the other. As shown in FIG. 3, a double tap (two taps in succession within a predetermined period of time, e.g., one second) on the right edge 54 of the CE device 10 is interpreted by the processor 14 as a command to present on the display 16 a first alarm menu, from which the user may select, using selector elements presented on the touchscreen display 16, various alarm parameters, e.g., on time, etc. Two taps on the left edge 56, on the other hand, signal a command to the processor 14 to present a second alarm menu on the display 16 which might provide for, e.g., setting alarm volume, duration, etc.

On the other hand, a single tap on the top 58 of the CE device 10 may correlate to a "snooze" command which, when received by the processor 14, causes the processor 14 to silence or terminate any audible alarm being presented on the audio display 18 (shown in FIG. 1). A single tap on the face of the display, in contrast, may indicate a command to toggle between a twelve hour time presentation and a twenty four hour presentation.

FIGS. 4-13 show tap-based user command input for various example application modes when entering the applications and executing the appropriate application module 30. For instance, FIG. 4 shows that the CE device 10 may be provided with an electronic book reader application, in which case a book text presentation 60 can be presented on the display 16. As shown in the table of FIG. 5, a single tap on the right edge 54 can correlate to a command to cause the processor 14 to present on the display 16 the page previous in the e-book file to the page being currently displayed. A double tap on the right edge can correlate to a command to cause the processor 14 to present on the display 16 the chapter previous in the e-book file to the chapter being currently displayed. Shaking in two dimensions can cause the processor 14 to delete the e-book file from the media 20.

In contrast, a single tap on the left edge 56 can correlate to a command to cause the processor 14 to present on the display 16 the next page in the e-book file relative to the page being currently displayed, whereas a double tap on the left edge can correlate to a command to cause the processor 14 to present on the display 16 the next chapter in the e-book file. A single tap on the top 58 of the CE device 10 can be correlated to a command to cause the text to scroll upward on the display 16, while a double tap on top can command the processor 14 to display the top of the page being currently presented. A single tap on the bottom of the CE device 10 can be correlated to a command to cause the text to scroll downward on the display 16, while a double tap on the bottom can command the processor 14 to display the bottom of the page being currently presented.

FIGS. 6 and 7 show that a music/video application may be provided on the CE device 10 for playing music and/or videos downloaded through, e.g., the WiFi interface 46 and stored on the media 20. A presentation 62 showing text and/or icons and/or thumbnails of available content may be shown on the display 16 and controlled using taps, example correlations of which are shown in FIG. 7.

For example, a single tap on the right side 54 can be interpreted as a command to play the current song at the beginning, while a double tap can be interpreted to mean play the previous song. A single tap on the left side can correlate to a command to play the next song. Shaking the housing 12 can be interpreted to play random songs. Pause and play the current song can be commanded by respectively tapping once and twice on the face of the display 16.

FIGS. 8 and 9 show that a note taking application may be provided on the CE device 10 for generating computer files representing handwriting recognition output based on user writing on the display 16. A presentation 64 showing text of notes may be shown on the display 16 and controlled using taps, example correlations of which are shown in FIG. 9.

For example, a single tap on the right side 54 can be interpreted as a command to show the previous note in the current note file while a tap on the left side 56 can be correlated to a command to show the next note. Shaking the CE device 10 can be correlating to a command to erase the current note. A single tap on the face of the display 16 can mean "list a directory of notes" while a double tap on the face or rear of the housing 12 can be correlated to a command to download the note to another component such as an intelligent telephone.

FIGS. 10 and 11 show that a recipe application may be provided on the CE device 10 for storing, viewing, and managing meal recipes. Accordingly, a presentation 66 showing text of recipes may be shown on the display 16 and controlled using taps, example correlations of which are shown in FIG. 11.

For example, a single tap on the right side 54 can be interpreted as a command to show a previous recipe (to the currently presented recipe) in a recipe directory stored on, e.g., the media 20, while a double tap on this surface can correlate to a command to show the previous category of recipes in the event that the recipe directory is partitioned by categories, e.g., "lunch" and "dinner". Similarly, a single tap on the left side 56 can be interpreted as a command to show a next recipe (to the currently presented recipe) in the recipe directory while a double tap on this surface can correlate to a command to show the next category of recipes. Shaking the housing 12 can be interpreted by the processor 14 as a command to erase the currently display recipe. Furthermore, a single tap on the face of the display 16 can mean "list a directory of recipes" while a double tap on the face or rear of the housing 12 can be correlated to a command to download the recipe to another component such as an intelligent telephone.

FIGS. 12 and 13 show that a grocery list application may be provided on the CE device 10 for storing, viewing, and managing grocery lists. Accordingly, a presentation 68 showing text of grocery lists may be shown on the display 16 and controlled using taps, example correlations of which are shown in FIG. 13.

For example, a single tap on the right side 54 can be interpreted as a command to show a previous item on the current list, while a double tap on this surface can correlate to a command to show the previous list. Similarly, a single tap on the left side 56 can be interpreted as a command to show a next item (to the currently presented or highlighted item) in the list while a double tap on this surface can correlate to a command to show the next list. Shaking the housing 12 can be interpreted by the processor 14 as a command to erase the currently display grocery list. Furthermore, a single tap on the face of the display 16 can mean "list a directory of grocery lists" while a double tap on the rear of the housing 12 can be correlated to a command to download the currently displayed list to another component such as an intelligent telephone.

With the above in mind, it may now be appreciated that present principles provide a CE device with an intuitive user interface in which fundamentally natural human gestures can be correlated to intuitive input signals.

Figure 14:
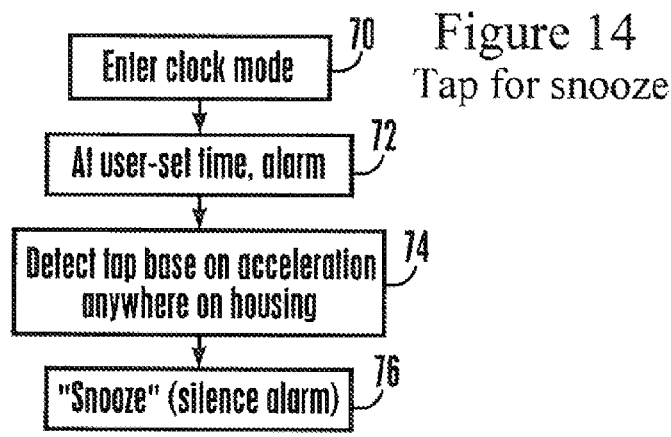
FIG. 14 is a flow chart of example logic executed by the processor to effect a snooze feature in the clock mode.

FIG. 14 provides example logic structure that may be executed by the processor 14. FIG. 14 is directed to a snooze feature, an example of which is described above, when in the clock mode.

Commencing at block 70 the clock mode is entered and at block 72 an audible alarm presented on the audio display 18 at a user-defined alarm time. Block 74 indicates that the processor 14 receives from the accelerometer 40 a spike signal indicating a tap, and the tap, in the clock mode, may occur anywhere on the housing 12, i.e., in any of the three dimensions. The alarm is silenced in response at block 76.

While the particular ACCELEROMETER-BASED TAPPING USER INTERFACE is herein shown and described in detail, it is to be understood that the subject matter which is encompassed by the present invention is limited only by the claims.

What is claimed is:

1. A consumer electronics (CE) device, comprising:
a housing bearing a processor, an audio display, and a visual display, the processor controlling the displays to present a plurality of menus, an audio and/or video application on the displays;
an accelerometer in the housing, the accelerometer operable to output signals to the processor representing acceleration of the housing, wherein the acceleration is induced by a person tapping the housing; and
the processor determining a surface of the housing being tapped and a number of taps on the surface within a predetermined period of each other,
wherein one or more taps on a first surface of the CE device is interpreted by the processor as a command to present a first menu of the plurality of menus on the visual display, and wherein one or more taps on a second surface of the CE device is interpreted by the processor as a command to present a second menu of the plurality of menus on the visual display.

2. The consumer electronics (CE) device of claim 1, wherein the processor is operable to correlate the surface being tapped and number of taps on the surface to a command to alter presentation of the audio and/or video application, wherein the command is a "next" command to cause the processor to present a next item in a list.

3. The consumer electronics (CE) device of claim 2, wherein the command is a "previous" command to cause the processor to present a previous item in a list.

4. The consumer electronics (CE) device of claim 2, wherein at least one tap on the first surface of the housing is correlated to a first command and at least one tap on a second surface of the housing is correlated to a second command different from the first command, the surfaces being orthogonal to each other.

5. The consumer electronics (CE) device of claim 2, wherein the application is a clock application and the processor causes an alarm to be presented on the audio display, the processor silencing the alarm in response to a signal from the accelerometer indicating a tap on the housing.

6. The consumer electronics (CE) device of claim 2, wherein the application is a music and/or video application, and the first command is a "play next" command and the second command is a "play previous" command.

7. The consumer electronics (CE) device of claim 2, wherein the application is a music and/or video application, and a single tap on the first surface of the housing is correlated to a "pause" command to cause presentation of an audio and/or video file to be paused, at least two taps being correlated to a "play" command to cause a paused audio and/or video file to be played on the CE device.

8. The consumer electronics (CE) device of claim 2, wherein the application is a reader application or a grocery list application or a recipe application.

9. The device of claim 1, wherein the processor is operable to correlate shaking of the housing with a predetermined function, the predetermined function comprising deleting or erasing a currently displayed item on the visual display.

10. A consumer electronics (CE) device comprising:
a housing bearing a processor, an audio display, and a visual display, the processor controlling the displays;
an accelerometer in the housing, the accelerometer operable to output signals to the processor representing acceleration of the housing;
the processor presenting a time of day on the visual display, the accelerometer sensing when a person taps various surfaces of the CE device to signal intended input meanings, a double tap on a first surface of the CE device being interpreted by the processor as a command to present on the visual display a first menu, from which the user may select, using selector elements presented on the visual display, various alarm parameters, two taps on a second surface of the CE device being interpreted by the processor as a command to present a second menu on the visual display.

11. The CE device of claim 10, wherein a single tap on a third surface of the CE device is interpreted by the processor to command the processor to silence an audible alarm being presented on the audio display.

12. The CE device of claim 11, wherein a single tap on a fourth surface of the CE device is interpreted by the processor as a command to cause the processor to toggle between a twelve hour time presentation and a twenty four hour presentation on the visual display.

13. A method comprising:
determining whether at least one tap has been made against one of a left edge or a right edge of a housing of a consumer electronics (CE) device based on signals from an accelerometer in the housing;
determining which of the left edge or the right edge of the housing has been tapped based on the signals from the accelerometer;
causing a next item of an application running on the CE device to be presented on a displays responsive to the processor determining that one of the left edge or the right edge of the housing has been tapped; and
causing a previous item of the application running on the CE device to be presented on the display responsive to the processor determining that other of the left edge or the right edge of the housing has been tapped.

14. The method of claim 13, wherein the application is a music and/or video application, and wherein the processor determines that a first command has been input by taps on the one of the left edge or the right edge and a second command has been input by taps on the other of the left edge or the right edge, and wherein the first command is a "play next" command and the second command is a "play previous" command.

15. The method of claim 13, wherein the application is a music and/or video application, and a single tap on a first surface of the housing is correlated to a "pause" command to cause presentation of an audio and/or video file to be paused, at least two taps being correlated to a "play" command to cause a paused audio and/or video file to be played on the CE device.

16. The method of claim 13, wherein the application is a reader application.

17. The method of claim 13, wherein the application is a grocery list application.

18. The method of claim 13, wherein the application is a recipe application or a notes application.

19. The method of claim 13, wherein a double tap on the right edge of the housing is correlated to a command to cause the processor to present on the display a previous chapter in an e-book file.

* * * * *